May 17, 1932.   H. A. HADLEY   1,858,588
SCALE BEARING
Filed April 16, 1927   2 Sheets-Sheet 1
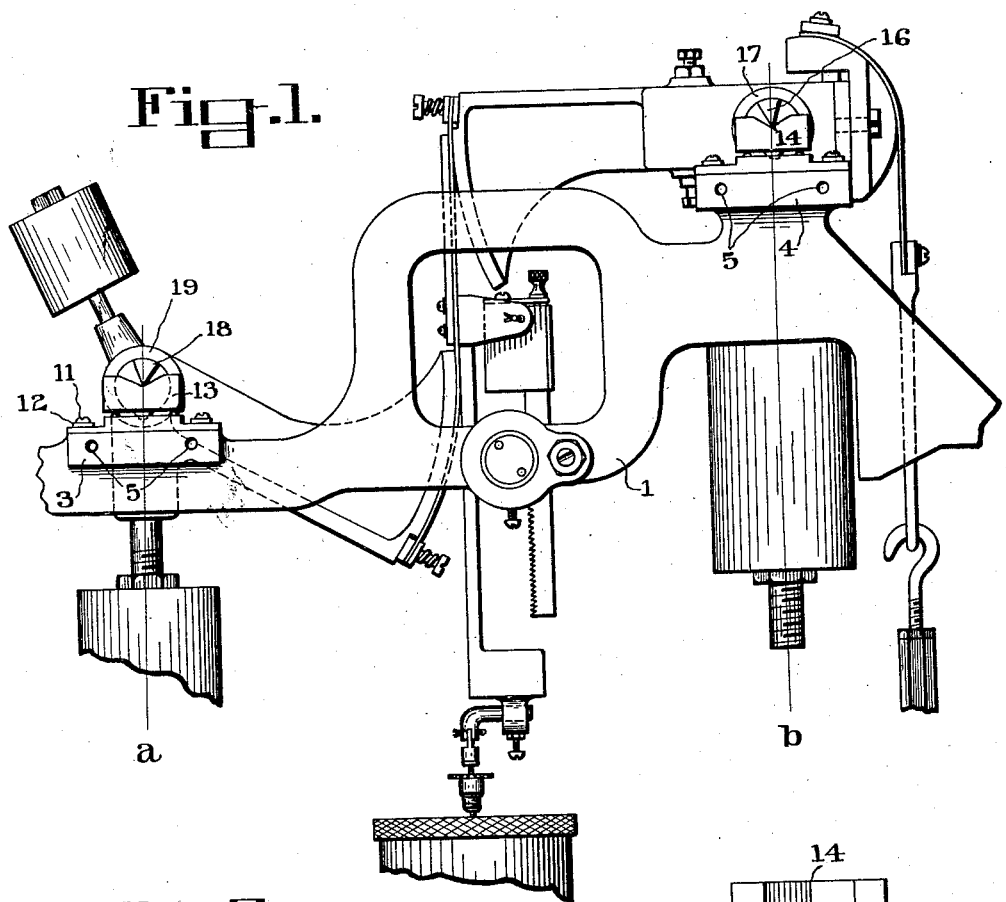
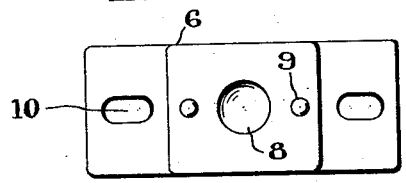
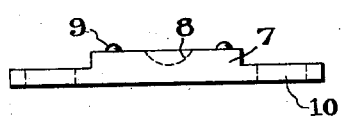
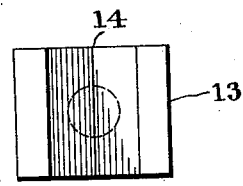
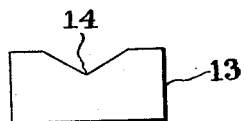
INVENTOR
*Harlan A. Hadley*
BY
ATTORNEY May 17, 1932.   H. A. HADLEY   1,858,588
SCALE BEARING
Filed April 16, 1927    2 Sheets-Sheet 2

INVENTOR
Harlan A. Hadley
BY
ATTORNEY

Patented May 17, 1932

1,858,588

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

SCALE BEARING

Application filed April 16, 1927. Serial No. 184,310.

This invention relates to scales and more particularly to scale bearings which are not only self-aligning but which adjust themselves automatically to form a line to line engagement with the knife edge pivots on the scale elements.

In its illustrated preferred embodiment, the invention is shown as applied to an automatic weighing scale of the pendulum type in which two sets of bearings are supported on a pendulum frame. The bearings retain the knife edge pivots in alignment with and at a fixed distance from each other, which is essential in this type of scale in order to maintain the vertical travel of the rack which rotates the pinion on the indicator shaft.

Heretofore, owing to the inherent characteristics of non-metallic bearings, it has been necessary to secure them to the frame by setting them in cement. This required great skill and much handling on the part of the operative, in order that the bearings be set in perfect alignment. Moreover, the frames with the bearings set in cement were often heated to dry, or cure, the cement more quickly. This heating frequently warped the frames and consequently threw the bearings out of their previous alignment. It is accordingly an important object of this invention to provide an improved bearing wherein the use of a cement securing means is unnecessary.

Another object of this invention resides in a novel holding means, or seat, for the bearing, said seat being adapted for adjustment longitudinally of the pendulum frame upon which it is mounted and for swivelly supporting the bearing for a rocking motion transversely of the seat, but preventing any rocking motion longitudinally thereof.

Still another object of this invention comprises a pendulum frame on which two sets of bearings support knife edge pivots on two pendulum arms, said sets of bearings maintaining the knife edge pivots in perfect alignment and in line to line engagement automatically.

Other features of this invention, together with certain details of construction and combination of parts, will be discussed in the specification and pointed out in the appended claims.

In the accompanying drawings:

Figure 1 is a side elevation of the head mechanism in a pendulum type of scale showing the bearing and holder as applied to a pendulum frame or assembly unit;

Figure 3 is a detail plan view of the bearing;

Figure 4 is a side elevation of the bearing;

Figure 5 is a detail plan view of the holder or seat;

Figure 6 is a side elevation of the holder; and

Figure 2:
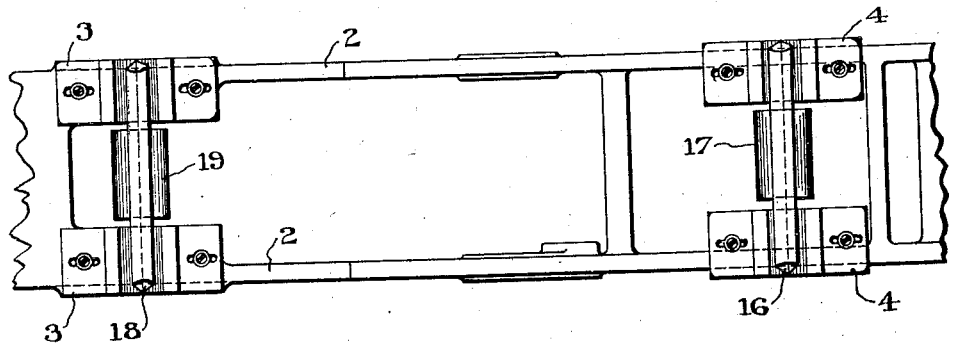
Figure 2 is a plan view of the pendulum frame showing the pivots of the pendulum arms each being supported on a set of bearings.

Figures 7 to 12, inclusive, are cross-sectional views of other embodiments of this invention.

Referring to the drawings in detail and particularly to Figures 1 to 6, inclusive, the pendulum frame 1 has two side walls 2 on which are located the thickened portions, or bosses, 3, 3, and 4, 4. These bosses are machined so that the surfaces of the bosses 3, 3, lie in a plane parallel to the plane of the surfaces of the bosses 4, 4. Screw holes 5, the purpose of which will hereinafter be set forth, are tapped in the bosses.

On each of the surfaces of the bosses are positioned the bearing holders, or seats, generally indicated by the reference character 6. Centrally of the seats, and integral therewith is a table 7 in the center of which is formed a circular recess 8. On the table 7 radially of the recess 8 and diametrically opposed to each other are formed the nibs 9, 9. The bearing holder is adapted to be adjustable longitudinally of the frame by means of elongated slots 10, 10, and are fastened to said frame by any suitable means, as by screws 11, and lock washers 12.

The bearing in the preferred embodiment of the invention is of a non-metallic substance, such as is disclosed in the patent to Dimitri et al., No. 1,374,493, issued April 12, 1921, having a hardness sufficient to resist the wear of the knife edge pivots used in this type of scale and is generally designated by the reference character 13. The bearing has in one face thereof a central groove 14, and from its opposite face projects the nose 15 which is hemispherical in contour. The 15 nose of the bearing is adapted to be rotatively and swivelly received in recess 8 and the surface from which the nose projects to rest on the nibs 9, 9. The vertical dimension of nose 15 is equal to the depth of the recess 8 plus the height of nib 9.

In Figure 2, the knife edge pivot 16 of pendulum arm 17 and the knife edge pivot 18 of auxiliary pendulum arm 19 are shown in position on the bearings 13 mounted in seats 6 on frame 1.

The construction above described permits of a transverse rocking of the bearing upon its nose 15, the nibs 9, however, preventing any longitudinal rocking. Any longitudinal rocking would tend to change the distance between points $a$ and $b$ (Figure 1). It is clear that the distance $a\,b$ must be maintained as constant as possible for every degree of angular motion of the pendulum arms, otherwise variations in the indicator readings of the scale will result from the alterations of the length of this distance. The construction also allows the bearing to rotate on its nose in a plane parallel to the plane of the surface of the bosses upon which the bearing holders are supported. It will accordingly be understood that the bearings are adapted to adjust themselves automatically to the knife edge pivots and that the latter will seat themselves in the grooves of the bearings in a line to line engagement therewith.

Any suitable means for taking the end thrust of the pivots may be employed with the improved bearing. A pivot cap (not shown) of the well-known type having an agate set therein may be attached to the boss by any suitable means, as by screws (not shown) inserted in screw-holes 5.

It will readily be seen that I have disclosed a bearing structure and arrangement which does away with the use of separate means for aligning the bearings in the frame to the knife edge pivots prior to setting the bearings in cement, but which insures a line to line engagement of the bearings with the pivots which results in a constant and permanent alignment and a fixed relationship between the pendulum arm pivots and makes for accuracy and uniformity in scale indications.

Figure 7:
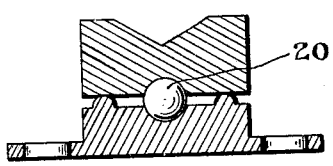
Figure 8:
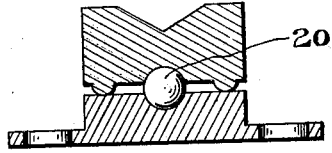

Figures 7 and 8 show a modification wherein the bearing is swiveled on a ball bearing 20.

Figure 9:
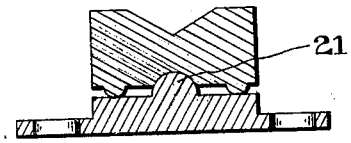
Figure 10:
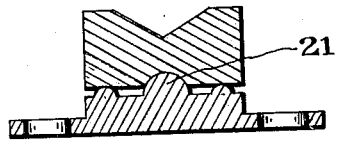

Figures 9 and 10 show a modified construction in which the nose 21 on which the bearing swivels is formed integral with the seat instead of the bearing.

Figure 11:
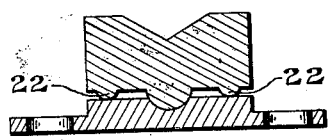

In Figure 11, I show a modification wherein the nibs 22 are formed integral with the bearing. It will be noted that Figures 8 and 9 also show this construction.

Figure 12:
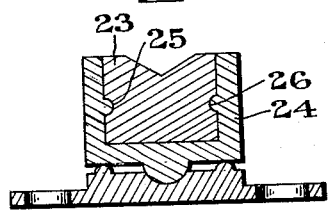

The embodiment shown in Figure 12 has an agate 23, having a sliding fit in a bakelite holder 24, and for the purpose of better retaining the agate in the holder, the former has longitudinal depressions 25 into which the ribs 26 of the holder enter.

Having thus described my invention, what I claim as new and desire to secure by Letters Patent in the United States, is:

1. In a device of the character described, the combination with a support, of a bearing seat having a recess therein mounted for longitudinal adjustment on said support, a bearing having a nose thereon mounted in said recess, and nibs on said seat adapted to prevent oscillation of said bearing longitudinally of said seat.

2. In a device of the character described, the combination with a support, of a bearing seat mounted for adjustment longitudinally of said support, a bearing swivelly mounted relative to said support, and projections on said bearing seat adapted to prevent oscillation of said bearing longitudinally of said seat.

3. In a device of the character described, the combination with a support, of a bearing seat adjustably mounted on said support, a bearing swivelly mounted relative to said support, and projections integral with said seat adapted to prevent oscillation of said bearing longitudinally of said seat.

4. In a device of the character described, in combination, a support, a bearing seat positioned on the said support and provided with a centrally raised table having a central recess therein, a bearing member mounted on said table and comprising a body portion having a transverse groove in one face thereof, a nose portion integral with the said body portion, projecting from the opposite face of the said body portion and seated in the central recess of the said bearing table, and means on the said bearing seat adapted to prevent oscillation of the said bearing member longitudinally of the said bearing seat.

5. In a device of the character described, in combination, a support, a bearing seat positioned on the said support and provided with a centrally raised table having a central recess therein, a bearing member mounted on said table and comprising a body portion having a transverse groove in one face thereof, a nose portion integral with the said body portion, projecting from the opposite face of the said body portion and seated in the central recess of the said bearing table, and diametrically opposed nibs on the face of said table, disposed from the central recess and engaging the under side of the said bearing member.

6. In a device of the character described, the combination with a support, of a bearing seat having a recess therein mounted for longitudinal adjustment on the said support, a bearing member including means for holding the said bearing member and a nose portion adapted to be seated in the said recess of the bearing seat, and nibs on the said bearing seat adapted to prevent oscillation of the said bearing member longitudinally of the said bearing seat.

7. In a device of the character described, the combination with a support, of a bearing seat mounted for adjustment longitudinally of the said support, a bearing member including means for holding the said bearing member and means for swivelly mounting the bearing member in the said support, and projections on the said bearing seat adapted to prevent oscillation of the said bearing member longitudinally of the said bearing seat.

8. In a device of the character described, the combination with a support, of a bearing seat adjustably mounted on the said support, a bearing member including means for holding the said bearing member, the said bearing member being swivelly mounted relative to the said support, and projections integral with the said bearing seat adapted to prevent oscillation of the said bearing member longitudinally of the said bearing seat.

9. In a device of the character described, the combination with a support, of a bearing seat adjustably mounted on the said support, a bearing member including a body portion and holding means provided with upstanding arms adapted to engage the sides of the said body portion, the said bearing member being swivelly mounted relative to the said support, and projections integral with the said bearing seat adapted to prevent oscillation of the said bearing member longitudinally of the said bearing seat.

10. In a device of the character described, the combination with a support, of a bearing seat having a recess therein mounted for longitudinal adjustment on the said support, a bearing member including a body portion and holding means provided with upstanding arms adapted to engage and hold the sides of the said body portion, the said bearing member being swivelly mounted in the said recess of the bearing seat, and nibs on the said bearing seat adapted to prevent oscillation of the said bearing member longitudinally of the said bearing seat.

11. In a device of the character described, the combination with a support, of a bearing seat having a recess therein mounted for longitudinal adjustment on the said support, a bearing member including a body portion having longitudinal recesses in its sides and holding means provided with upstanding arms having means adapted to engage the said recesses and hold the sides of the said body portion, the said bearing member being swivelly mounted in the said recess of the bearing seat, and nibs on the said bearing seat adapted to prevent oscillation of the said bearing member longitudinally of the said bearing seat.

12. In a device of the character described, the combination with a support, of a bearing seat having a recess therein mounted for longitudinal adjustment on the said support, a bearing member including a body portion having longitudinal recesses in its sides and holding means provided with upstanding arms having longitudinal ribs adapted to enter the said longitudinal recesses, the said bearing member being swivelly mounted in the said recess of the bearing seat, and nibs on the said bearing seat adapted to prevent oscillation of the said bearing member longitudinally of the said bearing seat.

HARLAN A. HADLEY.